2,803,675
Patented Aug. 20, 1957

2,803,675

METHOD FOR MAKING β-CHLOROSTYRENE COMPOUNDS

Robert R. Dreisbach and John F. Mulloy, Midland, Mich., assignors to The Dow Chemical Company, Midland, Mich., a corporation of Delaware No Drawing. Application September 9, 1955, Serial No. 533,499

9 Claims. (Cl. 260—651)

This invention relates to the making of β-chlorostyrene compounds and particularly pertains to the making of β-chlorostyrene compounds by chlorination of styrene compounds with chlorine generated in situ by chemical reaction.

When a styrene compound is chlorinated in the usual manner with molecular chlorine, the resulting reaction product is a mixture in which the corresponding styrene dichloride compound usually predominates. In some instances, the reaction mixture contains an appreciable proportion of the β-chlorostyrene compound. The formation of these compounds can be illustrated by equations portraying addition and substitution reactions of chlorine, respectively:

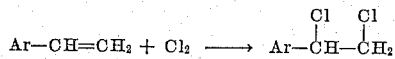

$$Ar-CH=CH_2 + Cl_2 \longrightarrow Ar-CH=CHCl + HCl$$

wherein the symbol Ar— represents an aromatic radical. In most instances, the yield of the β-chlorostyrene compound is low, and the method of chlorinating styrene compounds with molecular chlorine is not a generally satisfactory one for the preparation of β-chlorostyrene compounds.

It has now been discovered that the yield of β-chlorostyrene compounds can be considerably increased by chlorination of styrene compounds with chlorine generated in situ, i. e., by contacting styrene compounds with nascent chlorine generated by chemical reaction.

An object of this invention is to provide an improved method for making β-chlorostyrene compounds.

A more specific object is to provide such a method for making β-chlorostyrene compounds from styrene compounds by chlorination.

Another object is to provide such a method wherein the yield of β-chlorostyrene compounds is increased.

Other objects and advantages of the invention will be evident in the following description.

The objects of this invention have been attained in a method that comprises reacting a styrene compound with chlorine in a reaction mixture in which chlorine is generated by chemical reaction from chlorine-containing compounds in the presence of an excess of strong mineral acid. The chlorination reaction can be illustrated by the equation:

$$Ar-CH=CH_2 + 2[Cl] \rightarrow Ar-CH=CHCl + HCl$$

wherein the symbol [Cl] represents nascent chlorine generated in situ and the symbol Ar— represents an aromatic radical, especially a radical of the benzene series. The method is applicable to the preparation of β-chloro-derivatives of styrene compounds, e. g. styrene and styrene compounds having nuclear substituents, such as alkyl styrenes, alkoxystyrenes, and halostyrenes.

In one embodiment of this method, a styrene compound in a liquid form, i. e., a liquid styrene compound or a liquid dispersion of a styrene compound in an inert liquid diluent, is contacted with a strongly acidic aqueous composition in which nascent chlorine is generated by chemical reaction.

Nascent chlorine can be generated in situ in aqueous media in known ways, such as by action of mineral acids on mixtures of inorganic salts comprising inorganic chlorides and chlorates or hypochlorites. Typical reactions of this kind can be represented by the following ionic equations:

$$5Cl^- + ClO_3^- + 6H^+ \rightarrow 6[Cl] + 3H_2O$$
$$Cl^- + ClO^- + 2H^+ \rightarrow 2[Cl] + H_2O$$

Specific examples are illustrated by these equations:

$$NaClO_3 + 6HCl \rightarrow NaCl + 6[Cl] + 3H_2O$$
$$5NaCl + NaClO_3 + 3H_2SO_4 \rightarrow 3Na_2SO_4 + 6[Cl] + 3H_2O$$
$$Ca(OCl)_2 + 4HCl \rightarrow CaCl_2 + 4[Cl] + 2H_2O$$

Suitable compounds for use in the process are the alkali metal chlorides such as sodium chloride, the alkaline earth chlorides such as calcium chloride, hydrochloric acid, the alkali metal hypochlorites such as sodium hypochlorite, the alkaline earth hypochlorites such as calcium hypochlorite and bleaching powder, the alkaline earth metal chlorates and the alkali metal chlorates such as sodium chlorate. Hydrochloric acid is advantageously employed as the strong acid since it also supplies chloride ions, although other strong mineral acids such as sulfuric acid and phosphoric acid can be employed. Usually, there are prepared separate aqueous solutions of the chlorine-containing inorganic salt or salts and the mineral acid, and the separate solutions are admixed as needed. It is necessary that the reaction mixture in which the chlorine is generated be strongly acid, e. g. acidic to Congo red indicator, at all times during the chlorination of the styrene compound. Preferably, the separate solutions, i. e., the aqueous solution of the inorganic salt or salts and the aqueous solution of mineral acid, are fed together, and are admixed with the styrene compound, with agitation. Other modes of admixing the reactants can be employed instead of the one just described.

The temperature of the reaction mixture usually rises as chlorine is generated and subsequently consumed, and is advantageously maintained in a range wherein the reaction is rapid, yet controllable, e. g., between 0° C. and the boiling point of the reaction mixture, and preferably between 20° and 70° C. The operations are conveniently carried out at atmospheric pressure.

The reaction product mixture can usually be separated into an aqueous layer and an organic layer, and the organic layer can be treated, e. g. by fractional distillation, to obtain therefrom the β-chlorostyrene compound.

The following specific examples illustrate the invention, but should not be construed as limiting its scope. In the examples, percentages are by weight unless otherwise noted.

Example 1

Into an all-glass reactor equipped with a stirrer, a closed reflux condenser, a thermometer, two dropping funnels, and an external cooling water bath, was charged 2000 grams of a mixture of 2,5-dichlorostyrene and 2,5-dichloroethylbenzene. This mixture was the reaction product obtained by catalytic partial dehydrogenation of 2,5-dichloroethylbenzene and contained approximately 25 percent of 2,5-dichlorostyrene. Concentrated hydrochloric acid was charged to one dropping funnel, and to the other dropping funnel was charged a liquid solution containing six molecular proportions of sodium chloride, one molecular proportion of sodium chlorate, and enough water to make about 15–20 percent concentration of salts in solution.

After cooling the 2,5-dichlorostyrene charge, and with agitation, the concentrated hydrochloric acid was added in increments of 5–10 mls., and the chloride-chlorate salt solution was added in increments of 25–50 mls. over a period of about 4 hours to generate chlorine and to maintain the reaction mixture acidic to Congo red indicator. During this time, the temperature of the reaction mixture rose to, and was held at, about 40° C. by controlling the rate of addition of the chlorine-generating reactant solutions.

After addition of the chlorine-generating reactant solutions, the reaction mixture was cooled to about 30° C., and the organic layer was separated from the aqueous layer. A portion of the organic layer was analyzed by mass spectroscopy and found to contain 14.0 percent of $\beta$,2,5-trichlorostyrene and 2.7 percent of unreacted 2,5-dichlorostyrene. The neutral chlorinated organic material was fractionally distilled, and the $\beta$,2,5-trichlorostyrene was collected in a fraction boiling at 76° C. at about 0.3 mm. of mercury, absolute pressure. The yield of $\beta$,2,5-trichlorostyrene was 51 percent of theory based on the 2,5-dichlorostyrene charged, the remainder being converted principally to 1,4-dichloro-2-(1,2-dichloroethyl) benzene.

The compound $\beta$,2,5-trichlorostyrene is the subject of a copending application, Serial Number 533,498, and the the compound 1,4-dichloro-2-(1,2-dichloroethyl)benzene is the subject of a copending application, Serial Number 533,497, both filed concurrently herewith by R. R. Dreisbach, J. F. Mulloy, and F. J. Lowes.

Example 2

By a procedure similar to that described in Example 1, $\beta$,2,5-trichlorostyrene was prepared by reaction of 2,5-dichlorostyrene with chlorine generated in situ from calcium hypochlorite.

Calcium hypochlorite, having 71 percent available chlorine, was dissolved in water to make an approximately 10 weight percent solution thereof. To the apparatus described in Example 1, was charged 1500 grams of the mixture containing about 25 percent 2,5-dichlorostyrene in 2,5-dichloroethylbenzene also described in the preceding example. With cooling and agitation of the reaction mixture, concentrated hydrochloric acid was added in increments of 10–20 mls., and the calcium hypochlorite solution was added in increments of 50–75 mls. over a period of about 6 hours, during which time the temperature of the reaction mixture rose to, and was held at, about 40° C. The reaction mixture was strongly acid throughout the reaction period.

After addition of a quantity of calcium hypochlorite theoretically equivalent to one mole of chlorine per mole of 2,5-dichlorostyrene charged, the reaction mixture was cooled to about 30° C., and the layers were separated. The organic layer was washed with dilute aqueous sodium carbonate solution, dried over anhydrous sodium carbonate, and filtered. A portion of the organic layer was analyzed by mass spectroscopy and found to contain 14.9 percent $\beta$,2,5-trichlorostyrene, 0.6 percent of unreacted 2,5-dichlorostyrene, and 10.3 percent of 1,4-dichloro-2-(1,2-dichloroethyl)benzene.

The neutral chlorinated organic product was fractionally distilled, and the $\beta$,2,5-trichlorostyrene was collected in a fraction boiling at 76° C. at about 0.3 mm. of mercury, absolute pressure. The yield of $\beta$,2,5-trichlorostyrene was 54 percent of theory based on the 2,5-dichlorostyrene charged.

In contrast to the results obtained in the foregoing examples, when another portion of the same mixture of 2,5-dichlorostyrene and 2,5-dichloroethylbenzene therein described was chlorinated at a temperature of about 40° C. by bubbling a stream of molecular chlorine gas through the liquid mixture, the principal product was the addition product, 1,4-dichloro-2-(1,2-dichloroethyl)benzene, only about 31 percent of the 2,5-dichlorostyrene being converted to $\beta$,2,5-trichlorostyrene.

We claim:

1. A method for making $\beta$,2,5-trichlorostyrene, which method comprises feeding to a reaction zone (a) 2,5-dichlorostyrene in a liquid form, (b) an aqueous solution of hydrochloric acid and (c) an aqueous solution of sodium hypochlorite, forming a liquid reaction mixture comprising an organic liquid phase and a strongly acidic aqueous liquid phase, generating nascent chlorine in situ in the aqueous liquid phase, intimately contacting the organic liquid phase and the aqueous liquid phase at a temperature between 0° and 70° C., separating the organic liquid phase from the reaction mixture, and separating $\beta$,2,5-trichlorostyrene from the organic liquid.

2. A method for making $\beta$-chlorostyrene compounds, which method comprises intimately admixing (A) a styrene compound in a liquid form and (B) an acidic aqueous solution that comprises a strong mineral acid, an inorganic chloride, and an inorganic salt selected from the class consisting of inorganic chlorates and inorganic hypochlorites, at a temperature between 0° C. and the boiling point of the resulting mixture.

3. A method according to claim 2 wherein the acid is hydrochloric acid.

4. A method according to claim 2 wherein the inorganic salt is an inorganic chlorate.

5. A method according to claim 2 wherein the inorganic salt is an inorganic hypochlorite.

6. A method according to claim 2 wherein the styrene compound is 2,5-dichlorostyrene and the $\beta$-chlorostyrene compound is $\beta$,2,5-trichlorostyrene.

7. A method according to claim 6 wherein the acid is hydrochloric acid.

8. A method according to claim 6 wherein the inorganic salt is an inorganic chlorate.

9. A method according to claim 6 wherein the inorganic salt is an inorganic hypochlorite.

References Cited in the file of this patent

FOREIGN PATENTS 1,082,815   France _____ June 23, 1954